(12) United States Patent
Wei et al.

(10) Patent No.: US 11,044,486 B2
(45) Date of Patent: *Jun. 22, 2021

(54) SPLIT FRAMEBUFFER ENCODING

(71) Applicant: VMware, Inc., Palo Alto, CA (US)

(72) Inventors: Yuping Wei, Beijing (CN); Yong Lin Ma, Beijing (CN); Lizhu Zhang, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 16/292,255

(22) Filed: Mar. 4, 2019

(65) Prior Publication Data
US 2019/0200030 A1 Jun. 27, 2019

Related U.S. Application Data

(63) Continuation of application No. 14/939,156, filed on Nov. 12, 2015, now Pat. No. 10,225,570.

(51) Int. Cl.
| | |
|---|---|
| *H04L 29/08* | (2006.01) |
| *H04L 29/06* | (2006.01) |
| *H04N 19/172* | (2014.01) |
| *H04N 19/433* | (2014.01) |
| *H04N 19/127* | (2014.01) |
| *H04N 19/156* | (2014.01) |

(52) U.S. Cl.
CPC ......... *H04N 19/433* (2014.11); *H04L 65/602* (2013.01); *H04L 65/607* (2013.01); *H04L 67/36* (2013.01); *H04N 19/127* (2014.11); *H04N 19/156* (2014.11); *H04N 19/172* (2014.11)

(58) Field of Classification Search
CPC .................................................. H04N 21/8456
USPC .......................................................... 709/203
See application file for complete search history.

(56) References Cited

U.S. PATENT DOCUMENTS

| | | | |
|---|---|---|---|
| 2002/0097241 A1* | 7/2002 | McCormack | G06T 1/60 345/423 |
| 2004/0141515 A1* | 7/2004 | Xiao | H04W 28/06 370/412 |
| 2008/0040536 A1 | 2/2008 | Juang | |
| 2010/0195733 A1* | 8/2010 | Yan | H04N 19/87 375/240.16 |
| 2011/0085601 A1* | 4/2011 | Lee | H04N 19/44 375/240.25 |
| 2013/0204927 A1* | 8/2013 | Kruglikov | G06F 9/54 709/203 |

(Continued)

*Primary Examiner* — Moustafa M Meky
*Assistant Examiner* — Sm Z Islam

(57) ABSTRACT

A virtual desktop can be remoted to a client device by transmitting a video stream using a video coding format, such as H.264, where higher resolution video can be streamed than natively supported by the encoder or decoder. The encoder framebuffer is divided into a plurality of equal size child buffers, each child buffer is assigned an identifier for identifying the child buffer. Padding pixels can be added to the child buffers to make the child buffer size acceptable for the video coding format. The child buffers are encoded using the video coding format and the encoded frames are transmitted to a client. On the decoder side, the encoded child frames are decoded, padding pixels are removed, and the data is used to update corresponding child buffers in a framebuffer on the client display system.

20 Claims, 11 Drawing Sheets

(56) References Cited

U.S. PATENT DOCUMENTS

2013/0307709 A1* 11/2013 Miller ............... H03M 7/3093
 341/87
2014/0079327 A1* 3/2014 Diard .................. A63F 13/355
 382/233
2017/0013283 A1 12/2017 Zhang

* cited by examiner

SPLIT FRAMEBUFFER ENCODING

CLAIM OF PRIORITY

This application claims priority to and is a continuation of U.S. patent application Ser. No. 14/939,156, filed on Nov. 12, 2015, entitled "SPLIT FRAMEBUFFER ENCODING", by Yuping Wei, Yong Lin Ma, and Lizhu Zhang, which is incorporated herein by reference in its entirety.

TECHNICAL FIELD

The present disclosure generally relates to techniques for encoding video content and more specifically to encoding streamed video content in virtual desktop infrastructure applications.

BACKGROUND

With the rising popularity of cloud computing, remote desktop environments, such as those based on Virtual Desktop Infrastructure (VDI) and Desktop-as-a-Service (DAAS) have become rapidly growing industries. In a conventional VDI or DAAS environment, a user is provisioned a virtual desktop and is allowed to access his or her virtual desktop over a remote network connection, such as a WAN connection. The virtual desktops are typically hosted on servers that reside in a data center of the enterprise (or a third party service provider), and each host server may execute multiple virtual desktops. Users can utilize a client device to remotely log into their individual virtual desktop and all of the application execution takes place on the remote host server which is linked to the local client device over network, using a remote display protocol such as remote desktop protocol (RDP), PC-over-IP (PCoIP) protocol, virtual network computing (VNC) protocol, or the like. Using such a remote desktop protocol, the user can interact with applications of the virtual desktop, which are running on the remote host server, such that only the display (i.e., image data), keyboard, and mouse information is communicated with the local client device. A common implementation of a remote desktop protocol utilizes a server-side encoder to encode the image data prior to transmitting the image data to the client, where a client-side decoder decodes the image data so that it can be displayed on the client device. Frequently, the client-side decoder is a hardware decoder, which can provide power savings and accelerated decoding.

In many ways, VDI and DAAS provide a more centralized and efficient computing environment because each user is able to access his or her individual desktop from any device capable of making a network connection and from virtually any location. All of the user data is stored in the cloud (e.g., in a data center), providing more centralized management and quality of control for the organization that may employ the individual users.

However, a number of difficulties and inefficiencies still remain. One difficulty stems from the need to enable users with access to remote desktops from a variety of devices, such as smartphones, laptops, tablets, and personal computers. In particular, the growing popularity of high-resolution displays on client devices, such as 4K resolution, is creating inefficiencies and difficulties for streaming desktops where the underlying system is not designed for such high-resolution applications. For example, currently, common hardware decoders are designed to decode video with resolution of only up to 1080p. However, the display resolution on a modern client device may be significantly higher than 1080p, which can create numerous issues. For example, using such a hardware decoder for streaming a graphical user interface to a high-resolution client device may result in the graphical user interface not being able to leverage the full capabilities of the client device display. What is needed is a more efficient way for handling remote desktop streaming to client devices.

DETAILED DESCRIPTION

Figure 1:
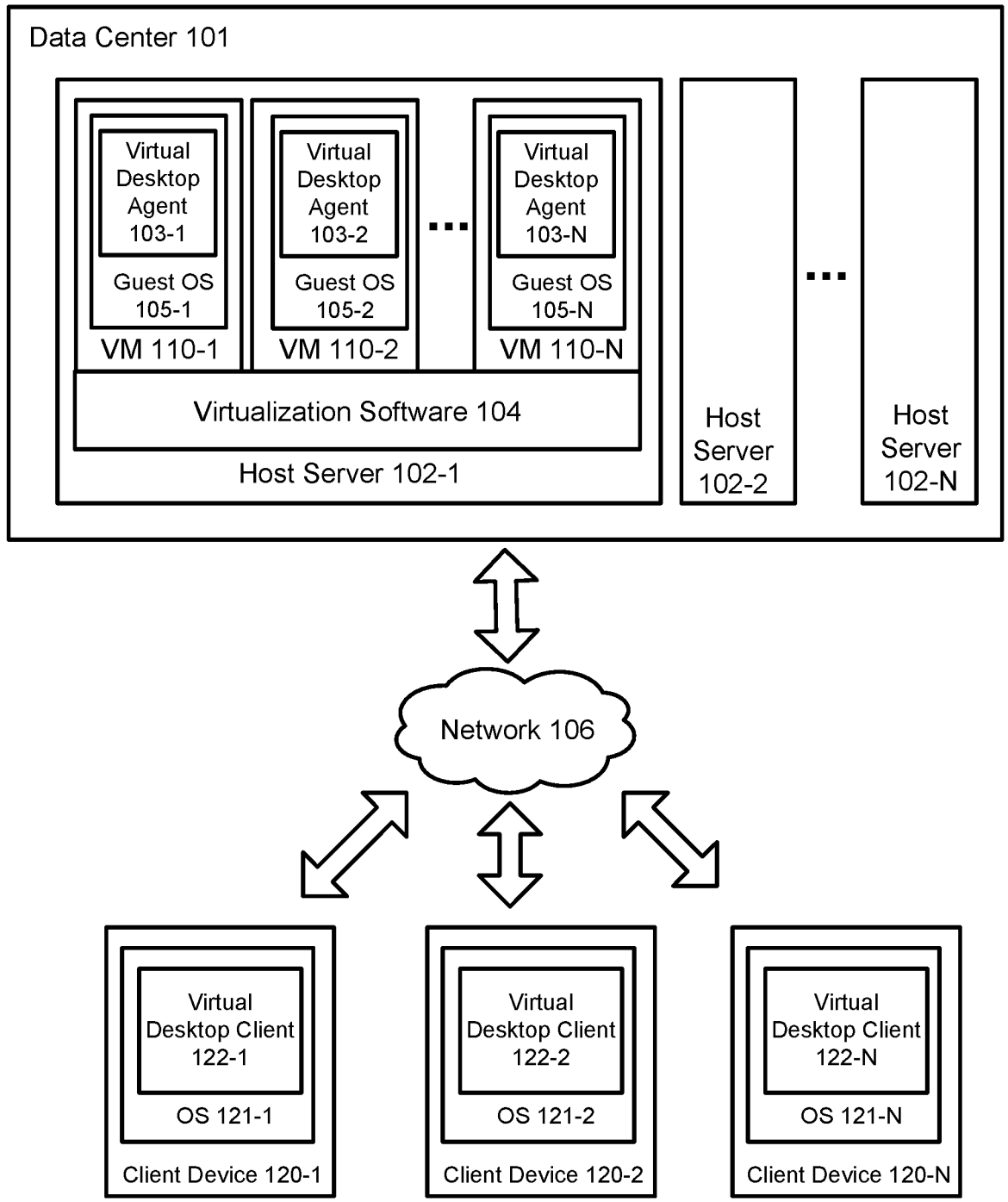
FIG. 1 illustrates an example of a virtual desktop environment, in accordance with various embodiments.

Systems and methods in accordance with various embodiments of the present disclosure overcome at least some of the above mentioned shortcomings and deficiencies by providing more efficient ways to handle remote desktop streaming to client devices. In particular, embodiments described herein improve the efficiency of streaming video to client devices with high resolution displays in virtual desktop infrastructure (VDI) settings. This can enable virtual desktops to leverage the full capabilities of high resolution client displays even in situations where the encoders and decoders utilized by the underlying remote desktop protocol are natively limited to lower resolution than the displays of the client device.

The system comprises an encoder that, instead of transmitting full encoded frames in a video stream, divides a framebuffer into multiple child buffers (each child buffer containing a portion of the original high resolution frame), encodes the child buffers to generate encoded child frames, and transmits the encoded child frames to a decoder in a client device. At the decoder, the encoded child frames are decoded and used to update a corresponding framebuffer in the client display system.

In various embodiments, an identifier is associated with each encoded child frame to identify which child buffer the encoded child frame was generated from, so that once the encoded child frame is decoded, it can be used to update the correct child buffer on the client display system. The client device uses the identifiers to reconstruct the original high resolution frame of the virtual desktop interface by combining the multiple child buffers which represent portions of that original frame. For example, such an identifier can comprise pixels or blocks of pixels that are added to each child buffer, uniquely identifying the child buffer from the other child buffers. Accordingly, when a child frame is encoded from the child buffer, the identifying information in the added blocks or pixels will be contained in the encoded child frame. The added blocks or pixels can be subsequently removed from the child frame on the client side, so that they do not appear on the client display.

In various embodiments, padding pixels can be added to child buffers to adjust the size of the child buffer so that the child buffer is acceptable for the encoder and/or decoder. For example, an encoder, such as an H.264 encoder, may require that the width of the child buffer is divisible by 16 and/or that the height is divisible by 8. In this case, additional rows of pixels can be added to the height and/or width of the child buffer to achieve compatible size. The padding pixels can be subsequently removed from the child frame on the client side, so that they do not appear on the client display once the original frame has been reconstructed and displayed.

In various embodiments, when encoding a child buffer, the system uses a previously encoded child frame from the same child buffer as a reference frame. In an embodiment, an existing multiple reference frame function in the video coding format can be enabled and the reference frame order can be adjusted such that, when encoding a child buffer, the system uses a previously encoded child frame from the same child buffer as a reference frame.

As a result, frames of virtually unlimited size can be transmitted from the encoder to the decoder by separating the original high resolution frame into a plurality of child frames. As mentioned above, this advantage is particularly important in situations where a hardware decoder is used. Hardware decoders are preferred in many cases due to improved power consumption, efficiency, and/or performance. For example, in mobile device applications, utilizing hardware decoders may be important for conserving power. However, hardware decoders generally have resolution limitations, creating difficulties for using the hardware decoder directly in high-resolution applications. For example, many client devices come equipped with H.264 video decoders and in many cases it is advantageous to utilize those decoders for remoting the display of a virtual desktop. Most such H.264 hardware decoders can only decode 1080p H.264 video, while client device display resolutions can be significantly larger. In this scenario and various others where large frame size and/or high resolution create difficulties for video streaming, the systems and methods described herein offer numerous advantages.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). The network connection between the client devices and the host servers is most commonly an Internet connection. Network 106 may further include numerous other components, such as one or more firewalls, connection brokers, management servers, etc., which are not shown here so as to not obscure salient features of the VDI environment. Host servers (102-1, 102-2, 102-N) may physically reside in a data center 101 of the enterprise (e.g., in case of VDI) or in a data center of a third party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the term "desktop" refers to a computing environment in which a user can launch, interact with, and manage the user's applications, settings, and data. Each client device (120-1, 120-2, 120-N) can allow a user to view on a desktop graphical user interface (on a local display device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client application (e.g., 122-1, 122-2, 122-N). The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In particular, the interaction can be performed by the virtual desktop agent transmitting encoded visual display information (e.g., framebuffer data) over the network to the virtual desktop client and the virtual desktop client in turn transmitting user input events (e.g., keyboard, mouse events) to the remote desktop agent.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment would include many more host servers which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention. Further, it should be noted that embodiments described herein are not limited to use as part of a virtual desktop environment but can also be implemented in a variety of other contexts.

Figure 2:
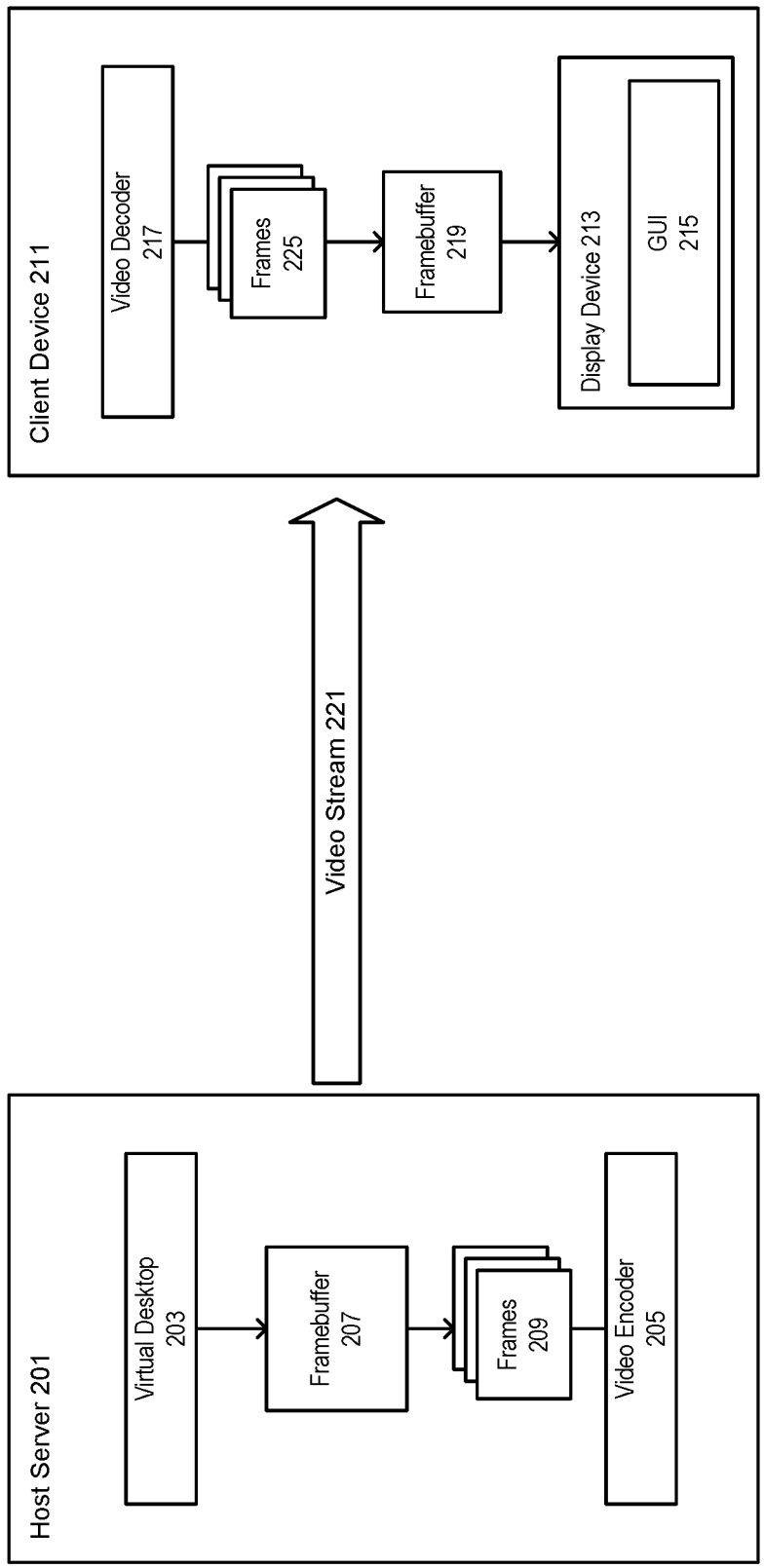
FIG. 2 illustrates an example of a host server streaming a video stream to a client device, in accordance with various embodiments.

FIG. 2 illustrates an example of a host server streaming a video stream to a client device, in accordance with various embodiments. As illustrated in the example of FIG. 2, a host server 201 hosts a virtual desktop 203 that is accessed by a client device 211. Client device 211 can be any computing device, such as a laptop, smartphone, personal computer, tablet, etc. Client device 211 contains a display device 213, such as a screen or a monitor, that displays the graphical user interface (GUI) 215 corresponding to the virtual desktop 203 to a user of the client device 211.

In various embodiments, on the host server 201 side, a framebuffer 207 can be an interface of the display system for the virtual desktop 203. Accordingly, frame data from the virtual desktop 203 can be contained in the framebuffer 207. From the framebuffer 207, frames 209 can be conveyed to a video encoder 205. The video encoder 205 encodes the frames 209 to produce encoded data, as will be described in more detail below, and conveys the encoded data to the client device 211 via a video stream 221. The video stream 221 therefore carries the image information of the virtual desktop interface that is transmitted over the network to the client device by utilizing a remote desktop protocol, such as PCoIP, VNC, RDP or the like.

On the client device 211 side, a video decoder 217 decodes the encoded data received from the host server to produce frames 225. Consequently, the frames 225 are used to update a framebuffer 219 and the display system displays content from the framebuffer 219 as the framebuffer 219 gets updated, thereby producing the GUI 215 on the display device 213.

As will be apparent to those skilled in the art, in various embodiments different methods can be used for implementing the framebuffer 219 on the client device 211 side. In one embodiment, the framebuffer 219 can be a block of memory managed by the system, where the system uses the decoded frames 225 to update the memory and asks the display system to show the memory once it is updated. In another embodiment, the framebuffer 219 can be the video memory of the display system and the system can update the video memory with the decoded frames 225 to update the display 213 content.

Various video coding formats can be used by the video encoder 215 to encode the video stream 221. In the VDI space, the H.264 format is commonly used. Other examples of video coding formats include MPEG-2 Part 2, MPEG-4 Part 2, HEVC, Theora, Dirac, RealVideo RV40, VP8, and VP9. In various embodiments, the encoder 205 and decoder 217 can be implemented in either hardware or software. As described above, performance advantages can be realized by implementing hardware components, particularly a hardware decoder 217. However, due to certain constraints, such as if the decoder 217 is an H.264 hardware decoder and/or is only able to decode up to 1080p resolution video, there may be challenges with using the decoder 217 directly to produce a GUI 215 at larger than 1080p resolution. For example, if the display device 213 is a 4K resolution screen, using a 1080p decoder 217 directly to generate a 4K resolution GUI 215 may be difficult or impossible. In these situations and others, the techniques described herein can be used to overcome certain limitations.

For instance, the resolution of the display device 213 may be 2,560×1,440 pixels. At the same time, the decoder 217 may be limited to 1080p resolution and only capable of handling frames that are up to 1,920×1,080 pixels in size. In various embodiments, as will be described below, to overcome such limitations the system can divide the framebuffer into multiple equal size child buffers.

Figure 3A:
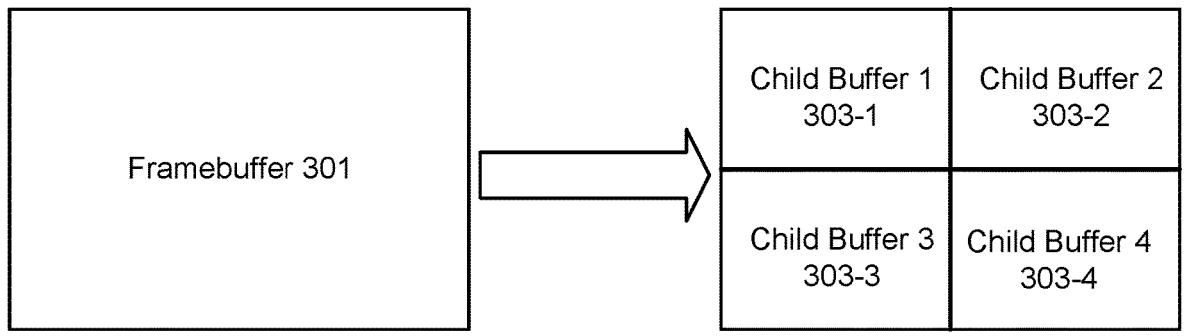
FIG. 3A illustrates an example division of a framebuffer into four equal child buffers, in accordance with various embodiments.

FIG. 3A illustrates an example division of a framebuffer into four equal child buffers, in accordance with various embodiments. As illustrated in the example of FIG. 3A, a framebuffer 301 can be divided into four equal size child buffers, child buffer 1 303-1, child buffer 2 303-2, child buffer 3 303-3, and child buffer 4 303-4.

Figure 3B:
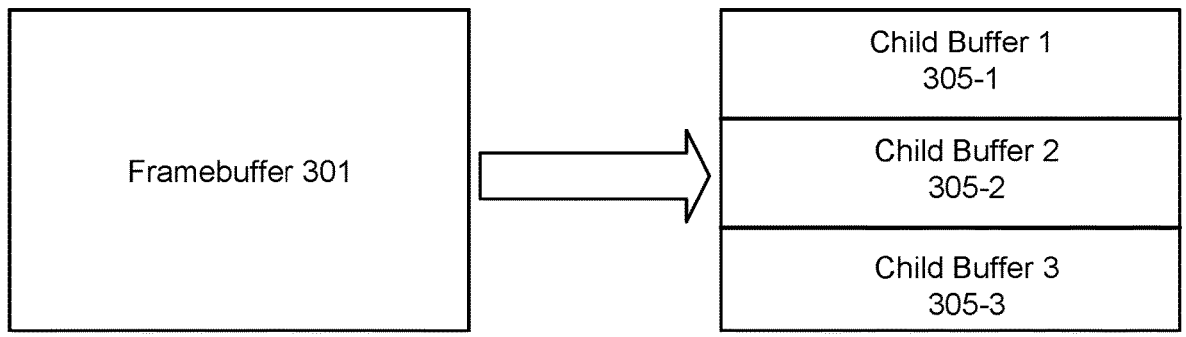
FIG. 3B illustrates an example division of a framebuffer into three equal child buffers, in accordance with various embodiments.

FIG. 3B illustrates an example division of a framebuffer into three equal child buffers, in accordance with various embodiments. As illustrated in the example of FIG. 3B, a framebuffer 303 can be divided into three equal size child buffers, child buffer 1 305-1, child buffer 2 305-2, and child buffer 3 305-3.

The examples of FIG. 3A and FIG. 3B illustrate just two possible ways to divide a framebuffer into child buffers. In other embodiments, the framebuffer can be divided into different numbers of child buffers and with different patterns so long as the resulting size of the child buffer is sufficiently small to be processed by the encoder and/or decoder.

Figure 4:
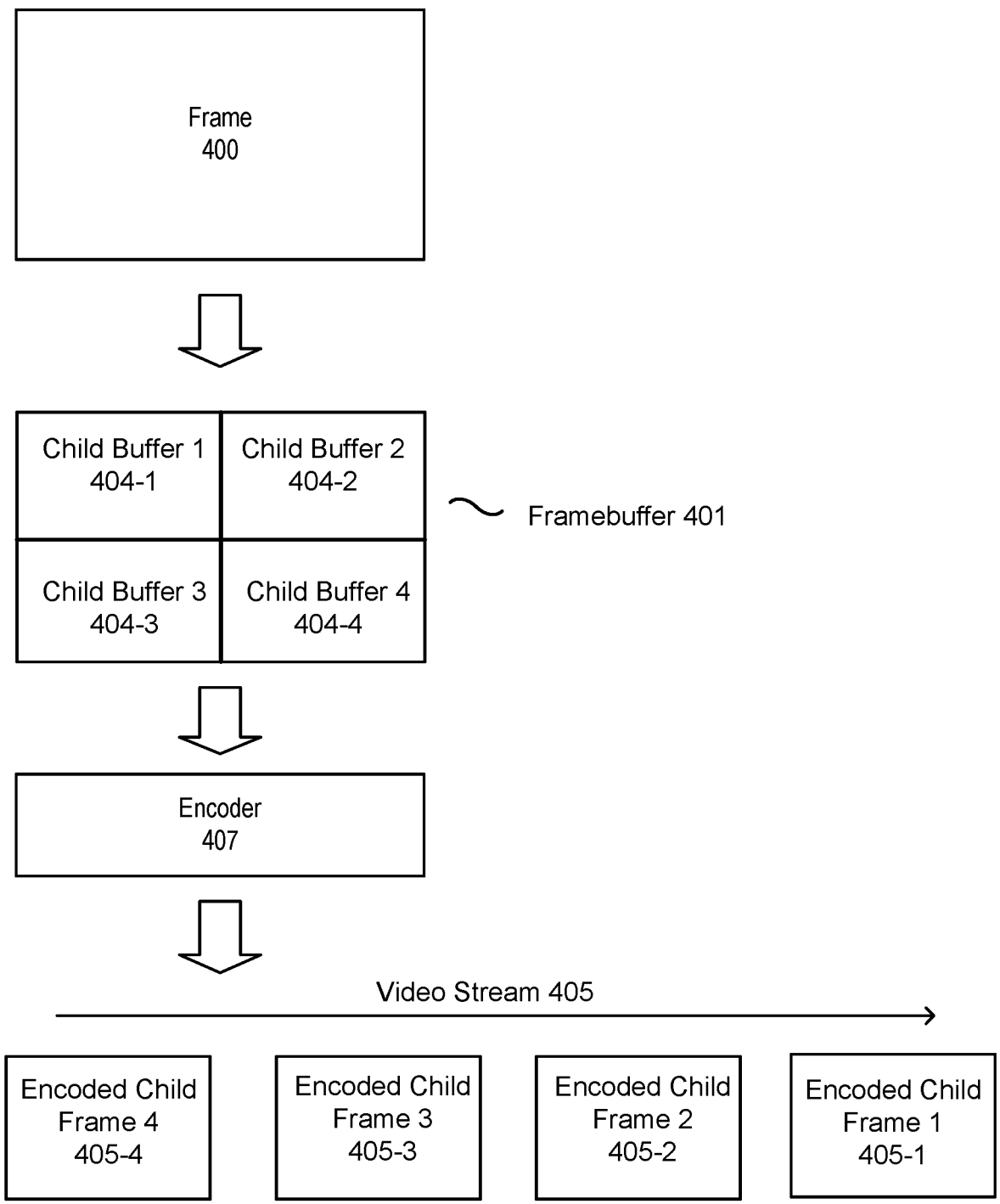
FIG. 4 illustrates an example of encoding a frame using child buffers, in accordance with various embodiments.

FIG. 4 illustrates an example of encoding a frame using child buffers, in accordance with various embodiments. As illustrated in the example of FIG. 4, a frame 400 is loaded into a framebuffer 401. For example, the frame 400 may be a frame of a GUI produced by a virtual desktop on a host server. The framebuffer 401 is divided into four child buffers (404-1, 404-2, 404-3, 404-4) and the child buffers are encoded by an encoder 407 to produce encoded child frames 1 through 4 (405-1, 405-2, 405-3, 405-4). For example, the encoder may encode the child buffers (404-1, 404-2, 404-3, 404-4) using the H.264 video coding format. Consequently, the encoded child frames (405-1, 405-2, 405-3, and 405-4) are transmitted in sequence via a video stream 405 to a destination device. Similarly, subsequent frames can be loaded into the framebuffer 401 and each of the child buffers (404-1, 404-2, 404-3, and 404-4) can be encoded to produce encoded child frames for the subsequent frames.

It should be noted that, when this disclosure refers to encoding a framebuffer or a child buffer, it refers to encoding the content of the respective framebuffer or child buffer. For example, when the encoder 407 of FIG. 4 encodes child buffer 1 404-1, it is encoding the portion of the frame 400 that was loaded into the framebuffer 401 that falls within the region of child buffer 1 404-1. Accordingly, when a different frame is loaded into framebuffer 401 and child buffer 1 404-1 is encoded again, a different encoded child frame than encoded child frame 1 405-1 may be generated.

In various embodiments, information can be associated with each encoded child frame (e.g., 405-1, 405-2, 405-3, 405-4) to identify which child buffer (e.g., 404-1, 404-2, 404-3, 404-4) the encoded child frame was generated from (e.g., so that the position of encoded child frames in the frame can be ascertained). Such information can be any kind of data capable of distinguishing between the child buffers. In a preferred embodiment, as will be described in more detail below, blocks of pixels containing such identifying information can be added to the child buffers (404-1, 404-2, 404-3, and 404-4) (hence, the blocks data would be conveyed to the encoded child frames (405-1, 405-2, 405-3, 405-4) in the subsequent encoding). Such approach may be preferable in order to make the process of identifying encoded child frames transparent to the system. Namely, if the identifying information is contained in a different source than the encoded child frame itself (e.g., 405-1, 405-2, 405-3, and 405-4), there could be potential challenges with synchronizing the identifying information with the encoded child frames (405-1, 405-2, 405-3, and 405-4). It can therefore be advantageous to encode the identifying information as blocks of pixels in the encoded child frame.

Figure 5:
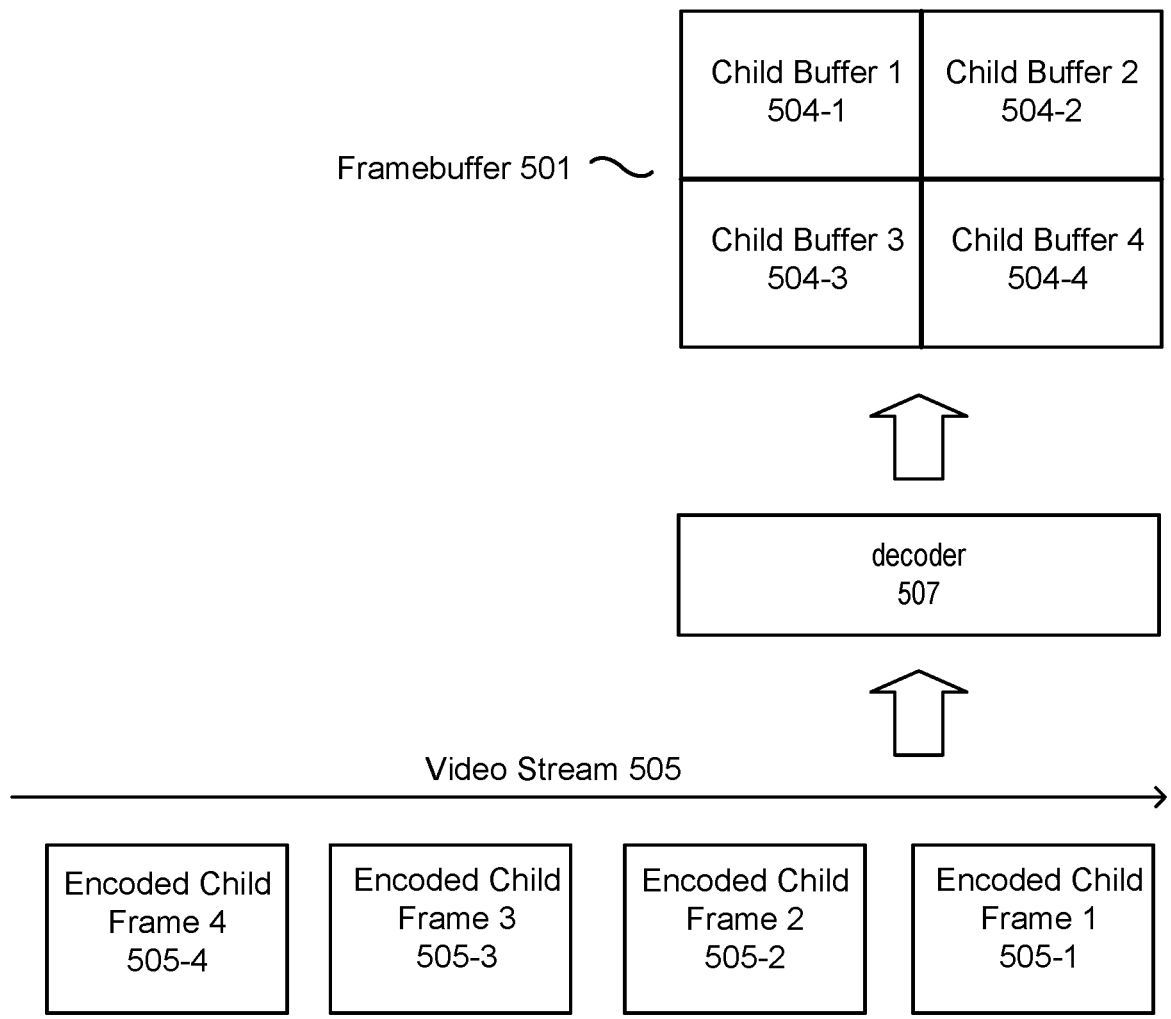
FIG. 5 illustrates an example of decoding a frame using child buffers, in accordance with various embodiments.

FIG. 5 illustrates an example of decoding a frame using child buffers, in accordance with various embodiments. As illustrated in the example of FIG. 5, a video stream 505 containing encoded child frames (505-1, 505-2, 505-3, and 505-4) is received. The encoded child frames (505-1, 505-2, 505-3, and 505-4) are decoded in a decoder 507 (e.g., using an H.264 coding format) and the decoded data from each of the encoded child frames (e.g., 505-1, 505-2, 505-3, and 505-4) is used to update the corresponding child buffers (504-1, 504-2, 504-3, and 504-4) of a framebuffer 501. In this fashion, the original high resolution frame of the virtual desktop is reconstructed by combining the child buffers on the client device.

As will be appreciated by those skilled in the art, in various embodiments different techniques can be used for handling display updates. In some cases, when an update to the GUI of the virtual desktop is generated on the host server, the update may affect only a portion of the entire GUI. In those cases, it may be advantageous to only transmit the child buffers which have been modified by the update, rather than transmitting all of the child buffers that comprise the entire original high resolution frame. This can reduce the amount of data that needs to be transmitted from the server to the client over the network. Once the updated child frames are received by the client device, they may be used to update the client display. For example, in one embodiment, when a child buffer (e.g., 504-1, 504-2, 504-3, 504-4) is updated, the updated child buffer can be driven to the display to update the corresponding portion of the screen and not the entire screen. In another embodiment, the entire framebuffer 501 may be driven to the display to update the entire screen.

In various embodiments, each encoded child frame (e.g., 505-1, 505-2, 505-3, 505-4) can have identifying information associated with it to indicate which child buffer (504-1, 504-2, 504-3, 504-4) should be updated with the data from the encoded child frame (e.g., 505-1, 505-2, 505-3, 505-4).

Figure 6A:
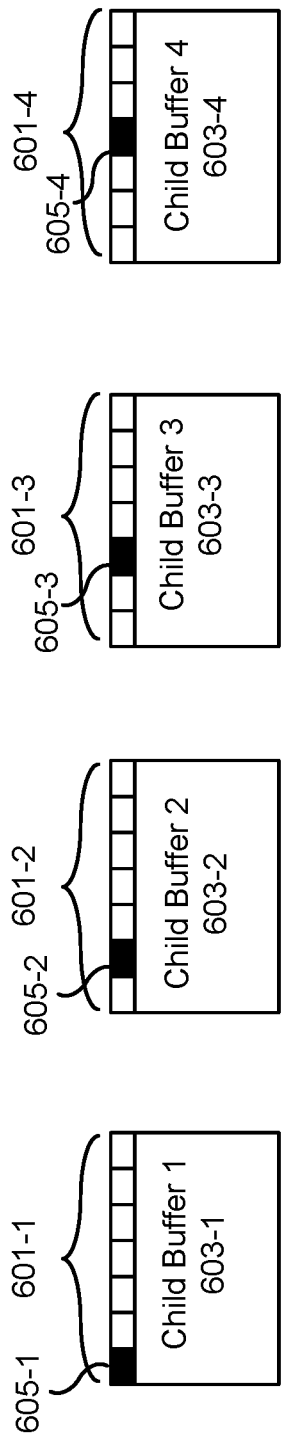
FIG. 6A illustrates an example of child buffers with blocks added for identification of encoded child frames that are generated from the child buffers, in accordance with various embodiments.

FIG. 6A illustrates an example of child buffers with blocks added for identification of encoded child frames that are generated from the child buffers, in accordance with various embodiments. As illustrated in the example of FIG. 6A, a row of blocks 601-1, 601-2, 601-3, 601-4 can be added on top of each child buffer 603-1, 603-2, 603-3, 603-4. For example, for an H.264 coding format, each block 601-1, 601-2, 601-3, 601-4 can be a 16×16 pixel macroblock. In various embodiments, the blocks can be of a different size, which can depend; for example, on the coding format. The color values of pixels in the added blocks 601-1, 601-2, 601-3, 601-4 can be used to uniquely identify the child buffers 603-1, 603-2, 603-3, 603-4. Namely, unique pixel values in the added blocks 601-1, 601-2, 601-3, 601-4 can be assigned for each child buffer 603-1, 603-2, 603-3, 603-4. For example, in child buffer 1 603-1, the first block 605-1 in the added row 601-1 can have a certain color value, such as the color black as illustrated, while the remaining blocks in the row 601-1 can have a different color value, such as white, as illustrated.

Hence, when the encoder encodes child buffer 1 603-1, the added blocks 601-1 will be contained in the generated encoded child frame. Subsequently, when the encoded child frame is decoded on the client side, the system can determine, based on the added blocks 601-1 (and the block 605-1), that the data in the encoded child frame should be used to update a corresponding child buffer 1 of a framebuffer on the client display system. Similarly, all subsequent encoded child frames that are generated by encoding child buffer 1 603-1 will contain the same identifying blocks to indicate to the system that the encoded child frames are to update a corresponding child buffer 1 of the client display system.

Similarly, the second block 605-2 in the added row 601-2 in child buffer 2 603-2, third block 605-3 in the added row 601-3 in child buffer 3 603-3, and fourth block 605-4 in the added row 601-4 in child buffer 4 603-4 can be black to identify child buffer 2 603-2, child buffer 3 603-3, and child buffer 4 603-4, respectively. In various embodiments, after an encoded child frame is decoded and the identifying information is read, the information (i.e., the added blocks 601-1, 601-2, 601-3, 601-4) can be removed, e.g., so that the blocks do not appear on the GUI when the framebuffer is driven to the display.

Figure 6B:
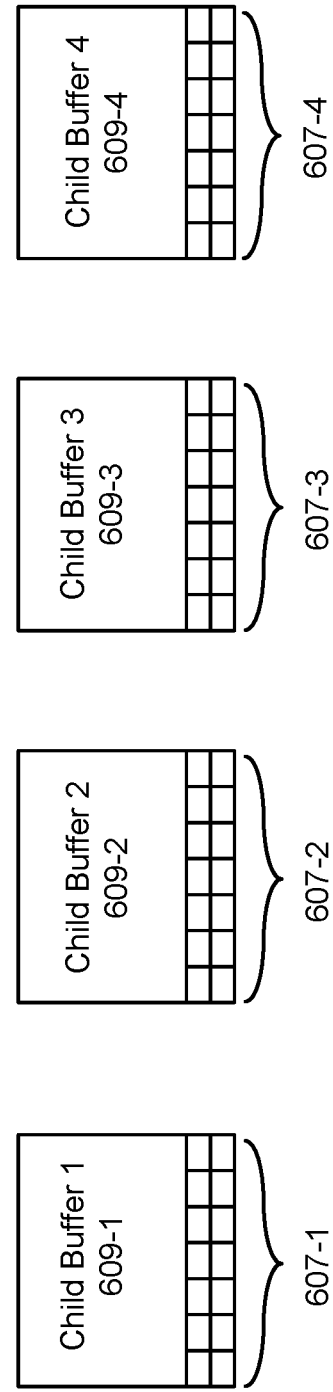
FIG. 6B illustrates an example of child buffers with padding pixels added to adjust the size of the child buffers, in accordance with various embodiments.

FIG. 6B illustrates an example of child buffers with padding pixels added to adjust the size of the child buffers, in accordance with various embodiments. As illustrated in the example of FIG. 6B, two rows of padding pixels 607-1, 607-2, 607-3, 607-4 can be added on the bottom of child buffers 609-1, 609-2, 609-3, 609-4 to adjust the size of the child buffers 609-1, 609-2, 609-3, 609-4. For example, in various embodiments, there may be constraints regarding the size of a child buffer (e.g., 609-1, 609-2, 609-3, 609-4) in the system. For example, the encoder and/or decoder may require that the width of the child buffer (e.g., 609-1, 609-2, 609-3, 609-4) is divisible by a certain number (e.g., 8) and/or that the height of the child buffer (e.g., 609-1, 609-2, 609-3, 609-4) is divisible by a certain number (e.g., 16). For example, the H.264 coding format has such constraints on size. In various embodiments, the system can determine if the size of the child buffers (e.g., 609-1, 609-2, 609-3, 609-4) is acceptable for encoding the child buffers with the used video coding format and, if the size is not acceptable, add a plurality of padding pixels (e.g., 607-1, 607-2, 607-3, 607-4) to the child buffers (e.g., 609-1, 609-2, 609-3, 609-4) to make the size acceptable.

Generally, to meet child buffer (e.g., 609-1, 609-2, 609-3, 609-4) size constraints, the system can add padding pixels to the right side and/or bottom side of the child buffer. In other embodiments, padding pixels can be added to any side of the child buffer, i.e., on top, bottom, right, and/or left.

In various embodiments, after the padding pixels 607-1, 607-2, 607-3, 607-4 are added to the child buffers 609-1, 609-2, 609-3, 609-4, the child buffers 609-1, 609-2, 609-3, 609-4 can be encoded in an encoder and the generated encoded child frames can be transmitted to a decoder in a client device. In the decoder, the encoded child frames can be decoded and the padding pixels can be removed, e.g., so that they do not appear on the GUI when a frame is driven from the framebuffer to the display.

In various embodiments, the system can implement reference frames in the encoding and decoding mechanism. As will be known to those skilled in the art, use of reference frames can improve the efficiency and performance of a video transmission. Generally, an encoder uses reference frames to define future frames in a video transmission. In some video encoding standards, such as MPEG-2, only one reference frame (the previous frame) is used for P-frames and two reference frames (one past and one future) are used for B-frames. Some modern video encoding standards, such as H.264, allow the use of multiple reference frames, where the encoder uses more than one previously decoded frame on which to base the next frame.

In various embodiments, different types of reference frame systems can be used in the encoding and decoding of child buffers, provided that, when encoding a child buffer, encoded child frames from the same child buffer are used as reference frames. For example, the encoder can use a previous encoded child frame of child buffer 1 as a reference frame to define a future frame for child buffer 1 (but the encoder should not use encoded child frames from child buffers other than child buffer 1). Similarly, in another embodiment, the encoder can use multiple previous frames of child buffer 1 as reference frames for defining a future frame for child buffer 1. In various embodiments, a coding format's, such as H.264, built-in multiple reference frame feature can be used for encoding and decoding child buffers by adjusting a reference frame order of the video coding format such that, when encoding a child buffer, a previously encoded child frame from the same child buffer is used as a reference frame.

Figure 7:
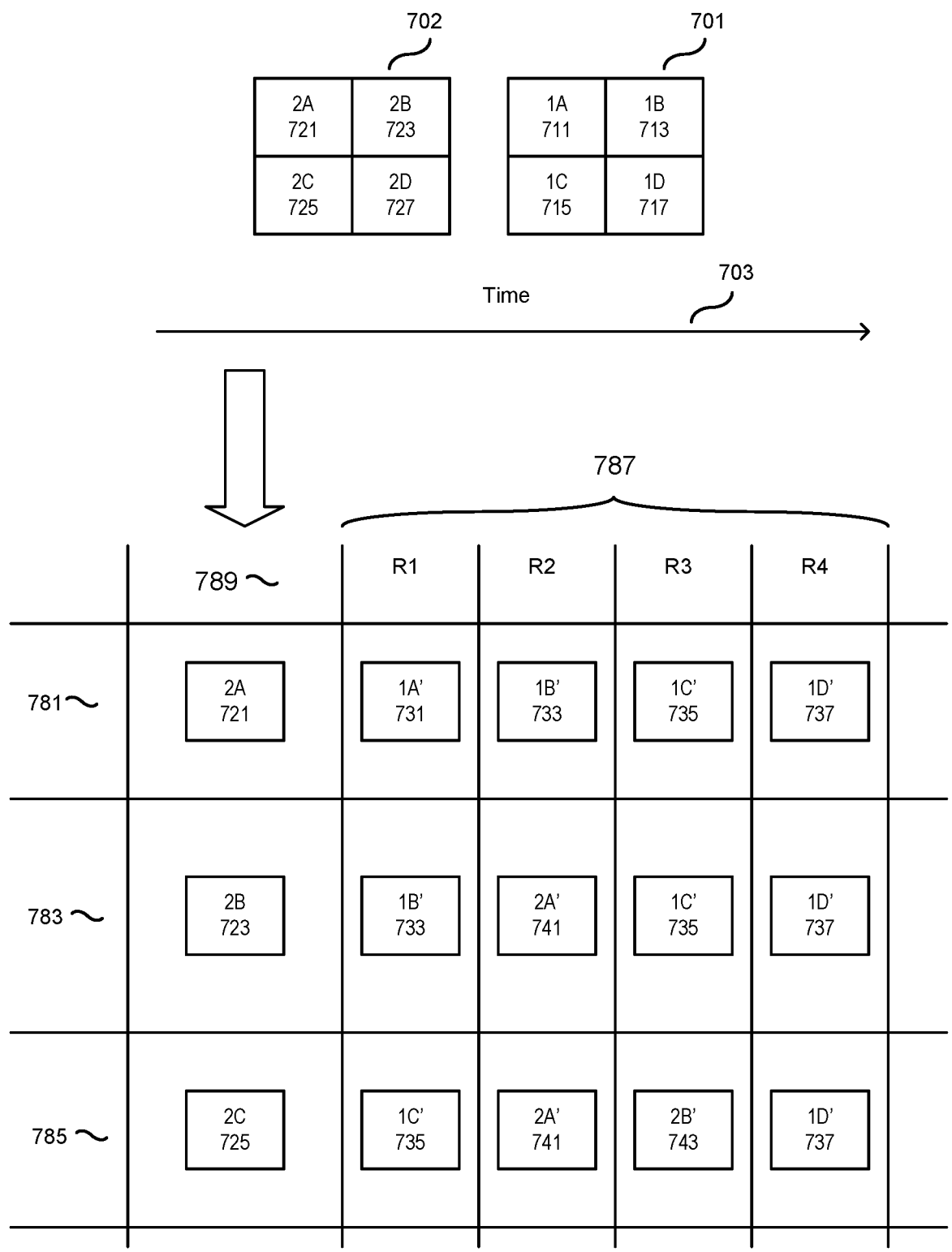
FIG. 7 illustrates an example use of reference frames in encoding, in accordance with various embodiments.

FIG. 7 illustrates an example use of reference frames in encoding, in accordance with various embodiments. The example of FIG. 7 can be illustrative of the use of a built-in multiple reference frame feature in a coding format, such as the multiple reference frame feature of the H.264 format, where the reference frame order is adjusted by the system to enable it to work with the child buffer-based system described in various embodiments. As will be illustrated, the example of FIG. 7 allows the multiple reference frame feature of a coding format to be used to encode child buffers based on one previous reference frame.

As illustrated in the example of FIG. 7, two framebuffers 701, 702 are processed by an encoder. For purposes of clarity, it should be noted that framebuffer 701 and framebuffer 702 represent the same physical framebuffer containing different frames. As indicated by the time arrow 703, framebuffer 701 is processed before framebuffer 702. Accordingly, framebuffer 701 contains frame data of a first frame and framebuffer 702 contains frame data of a second frame. Framebuffer 701 is divided into four child buffers, 1A 711, 1B 713, 1C 715, and 1D 717. Similarly, framebuffer 702 is divided into four child buffers, 2A 721, 2B 723, 2C 725, and 2D 727.

The child buffers are encoded one at a time in chronological order. When encoding a child buffer, if a previous frame for the child buffer does not exist, then the child buffer can be encoded without the use of a reference frame. Accordingly, child buffer 1A 711 is encoded without using a reference frame to produce reference frame 1A' 731. Similarly, child buffer 1B 713 is encoded to produce reference frame 1B' 733, child buffer 1C 715 is encoded to produce reference frame 1C' 735, and child buffer 1D 717 is encoded to produce reference frame 1D' 737.

After child buffers 1A 711, 1B 713, 1C 715, and 1D 717 are encoded, the reference frames 1A'-1D' (731, 733, 735, 737) can be used for encoding subsequent buffers. Reference frames are assigned a reference index. When encoding a child buffer, a reference frame with the lowest reference index is used first. Hence, when a single reference frame is used, the reference frame with an index of R1 will be used as a reference frame for the encoding. Thus, when encoding a child buffer, the reference indexes of the reference frames need to be adjusted such that the most recent reference frame from the same child buffer is assigned the lowest reference index. For example, when encoding child buffer 2A, the most recent reference frame from child buffer A (i.e., reference frame 1A') should have the lowest reference index so that it is used as the reference frame. In a scenario where a multiple reference frame feature of a coding format is used, as illustrated in FIG. 7, this can be achieved by adjusting the reference index of reference frames every time a child buffer is encoded.

The example of FIG. 7, illustrates four reference index columns R1 through R4 787. The reference index of a reference frame at a particular time is indicated by the column in which the reference frame is located. Column 789 lists child buffers that are being encoded (in chronological order, top to bottom). When a child buffer is encoded, the reference frames in the same row as the child buffer are available for use as reference frames based on their reference index. For example, in row 781, child buffer 2A 721 is being encoded and reference frames 1A' 731, 1B' 733, 1C' 735, and 1D' 737 are available for use in the encoding as reference frames. Because reference frame 1A' 731 has the lowest reference index of R1, the reference frame 1A' 731 is used as a reference frame for encoding child buffer 2A 721. After child buffer 2A 721 is encoded, the reference frame 2A' 741 replaces the reference frame 1A' 731 as the new reference frame for subsequent encoding because it is the most recent reference frame from child buffer A.

Consequently, when encoding child buffer 2B 723, the reference frames are rearranged to assign reference frame 1B' 733 the lowest reference index of R1, because it is the most recent reference frame from child buffer B. Child buffer 2B 723 can then be encoded using reference frame 1B' 733 as a reference frame to produce reference frame 2B' 743. After child buffer 2B 723 is encoded, the reference frame 2B' 743 replaces the reference frame 1B' 733 as the new reference frame for subsequent encoding because it is the most recent reference frame from child buffer B.

Consequently, when encoding child buffer 2C 725, the reference frames are rearranged to assign reference frame 1C' 735 the lowest reference index of R1, because it is the most recent reference frame for child buffer C. Child buffer 2C 725 can then be encoded using reference frame 1C' 735 as a reference frame. The process can continue similarly for child buffer 2D 727 and for subsequent frames.

Figure 8:
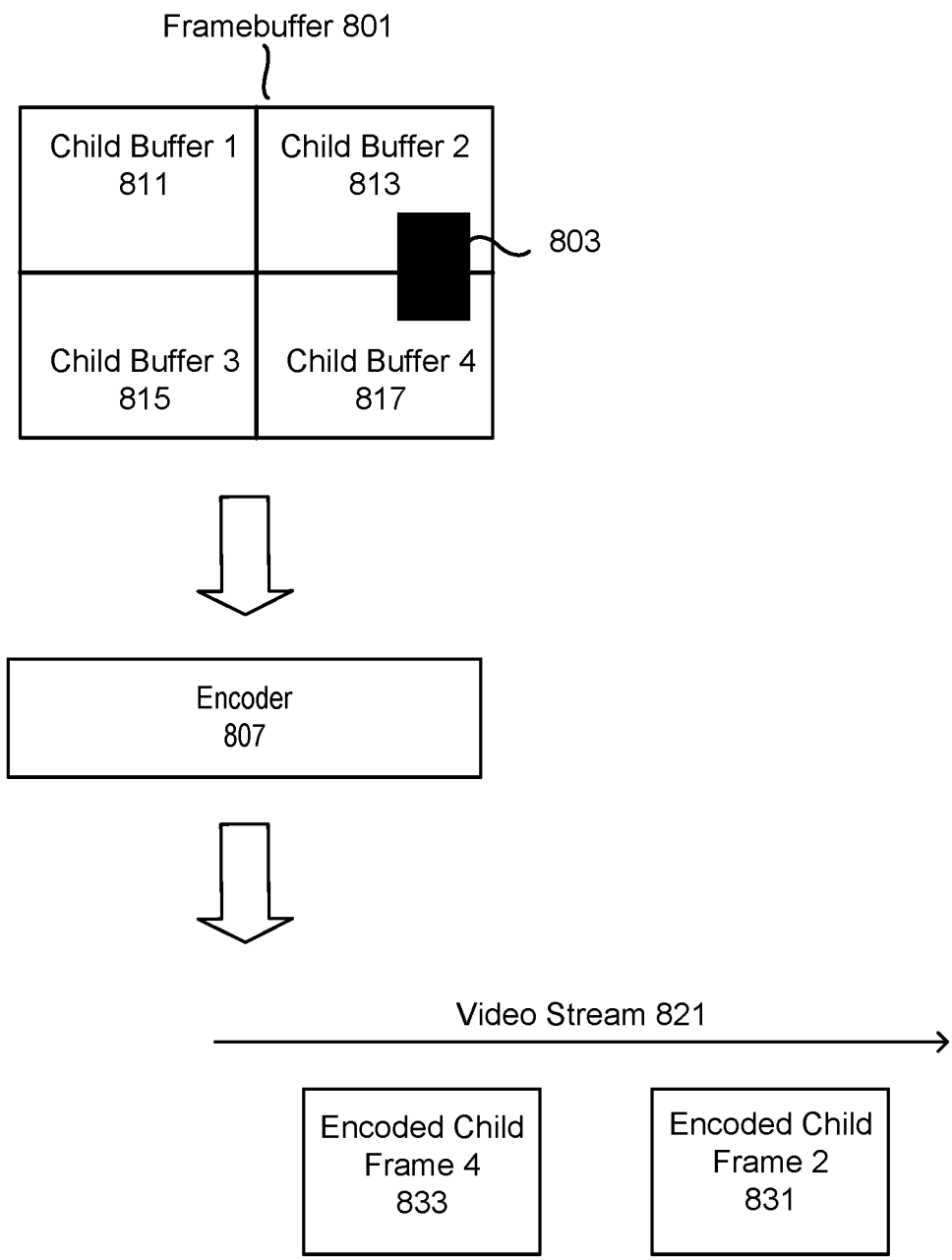
FIG. 8 illustrates an example of child buffers being selectively encoded and transmitted when there is a change in the corresponding region of the frame, in accordance with various embodiments.

FIG. 8 illustrates an example of child buffers being selectively encoded and transmitted when there is a change in the corresponding region of the frame, in accordance with various embodiments. As illustrated in the example of FIG. 8, a framebuffer 801 containing frame data is divided into four child buffers 1-4, 811, 813, 815, 817. Region 803 represents a change in the framebuffer from a framebuffer containing a previous frame (not shown). Hence, child buffer 1 811 and child buffer 3 815, did not change from the previous framebuffer, while child buffer 2 813 and child buffer 4 817 did change. Accordingly, the system conveys child buffer 2 813 and child buffer 4 817 to an encoder 807, where the child buffers are encoded to produce encoded child frame 2 831 and encoded child frame 4 833. The encoded child frames 2 and 4 (831, 833) are then transmitted in a video stream 821. Notably, child buffer 1 811 and child buffer 3 815 are not encoded or transmitted. Namely, because child buffer 1 811 and child buffer 3 815 did not change, transmitting these framebuffers is unnecessary as they are already present on the receiving device. Hence, resources are preserved and performance is improved by avoiding sending redundant information. For example, in various embodiments, the system can be configured so that the client display system is notified or is otherwise made aware that there was no change in child buffer 1 811 and child buffer 3 815, so that the corresponding data from the previous frame can be re-used in the current frame.

Thus, in various embodiments, the system can determining if each of the child buffers in a framebuffer is changed from the preceding framebuffer. Consequently, the system can transmit only the changed child buffers.

Figure 9:
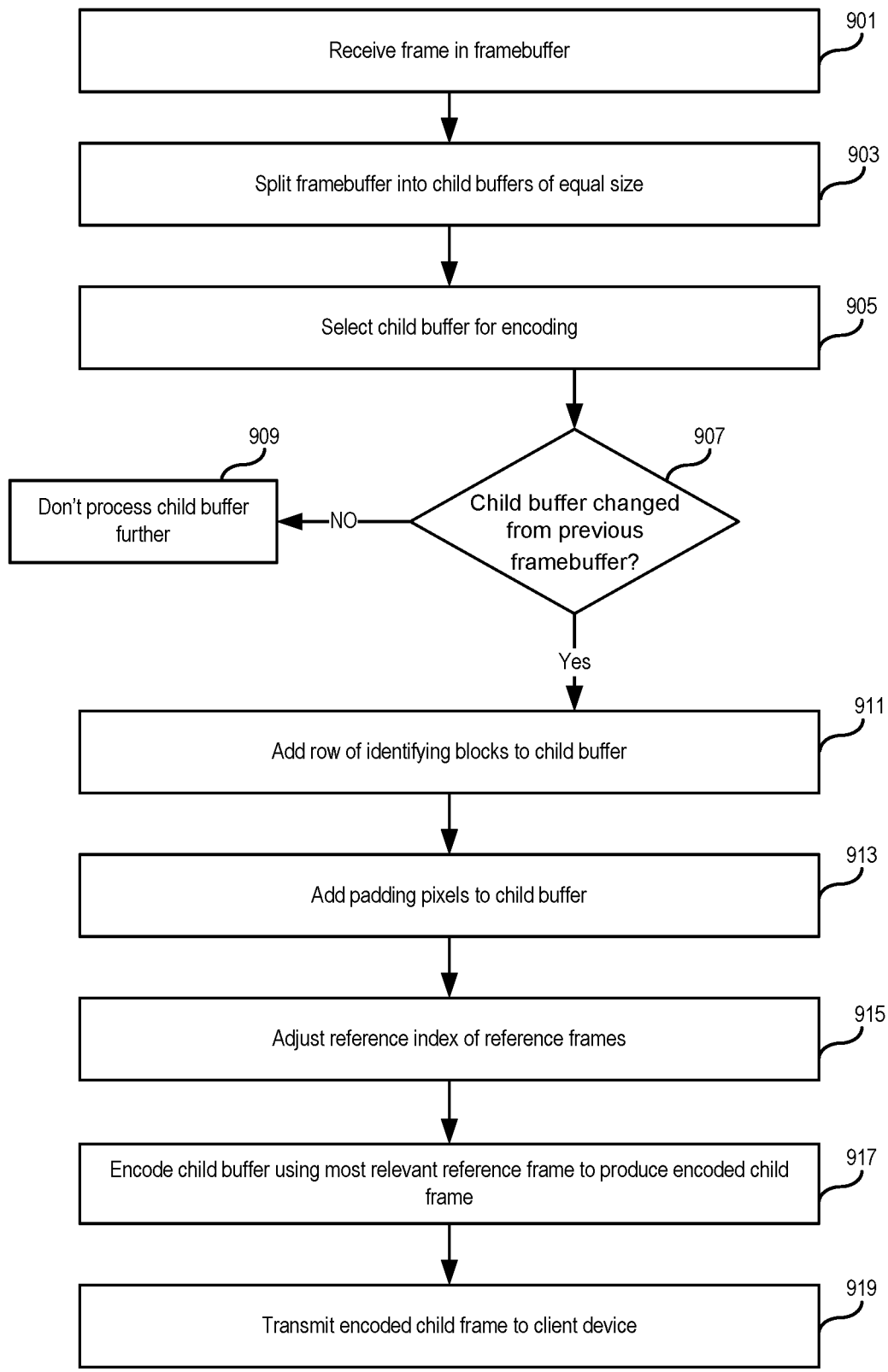
FIG. 9 illustrates a process flow for encoding a child buffer, in accordance with various embodiments.

FIG. 9 illustrates a process flow for encoding a child buffer, in accordance with various embodiments. In operation 901, a frame is received in a framebuffer of the encoding device. For example, the frame can be a frame of a GUI stream from a virtual desktop hosted by a host server in a VDI environment. In operation 903, the framebuffer is split into child buffers of equal size. In operation 905, a child buffer is selected for encoding. In operation 907, a determination is made on whether the child buffer changed from the previous framebuffer. If the child buffer did not change, then the child buffer is not processed further, as indicated in operation 909. If the child buffer did change, then a row of identifying blocks is added to the child buffer, as indicated in operation 911, to identify the child buffer in the encoded child frame that will be subsequently generated from the child buffer. In operation 913, padding pixels are added to the child buffer to make the child buffer size compatible for the video coding format. In operation 915, the reference index of reference frames is adjusted such that the most recent reference frame from the child buffer is assigned the lowest reference index. For example, a multiple reference frame feature of the video coding format may be used and the reference index of reference frames be adjusted, as described previously. In operation 917, the child buffer is encoded using the most relevant reference frame to produce an encoded child frame. In operation 919, the encoded child frame is transmitted to the client device.

Figure 10:
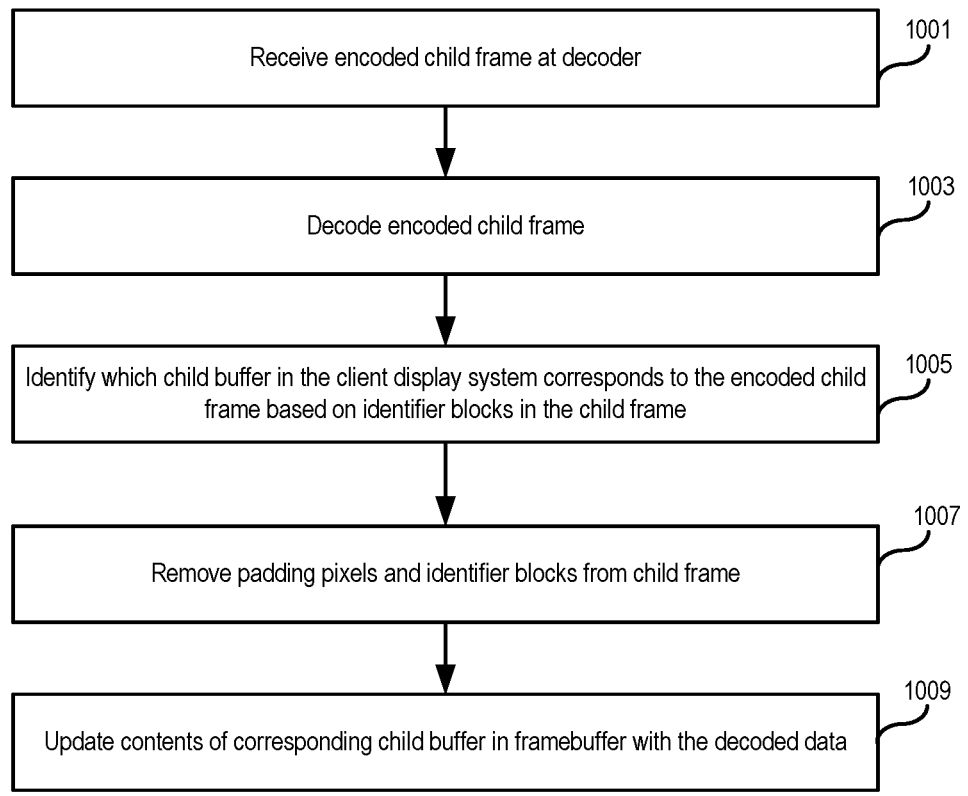
FIG. 10 illustrates a process flow for decoding a child buffer, in accordance with various embodiments.

FIG. 10 illustrates a process flow for decoding a child buffer, in accordance with various embodiments. In operation 1001, an encoded child frame is received at a decoder. For example, the decoder can be in a client device and the encoded child frame can be part of a GUI stream received at the client device from a virtual desktop hosted by a host server in a VDI environment. In operation 1003, the encoded child frame is decoded by the decoder. In operation 1005, the system identifies which child buffer in the client display system corresponds to the encoded child frame based on identifier blocks in the child frame. In operation 1007, padding pixels and identifier blocks are removed from the child frame. In operation 1009, the decoded data is used to update the contents of the corresponding child buffer in the framebuffer of the client display system.

In an embodiment, the system can be configured to implement the split framebuffer encoding, as described herein, when the system detects that a device with higher resolution than can be handled directly by a video coding format is being used by a client. In another embodiment, the system can be configured to implement the split framebuffer encoding, as described herein, when it detects that frames of higher resolution than can be handled directly by a video coding format are being used or requested. In various embodiments, the host- and client-side systems may need to communicate, e.g., to ascertain that framebuffers on the host and client side are split accordingly, to communicate location of padding pixels, to communicate location of identifying blocks, etc. In such cases, the system can implement a communication protocol between the host and the client to convey such information.

Figure 11:
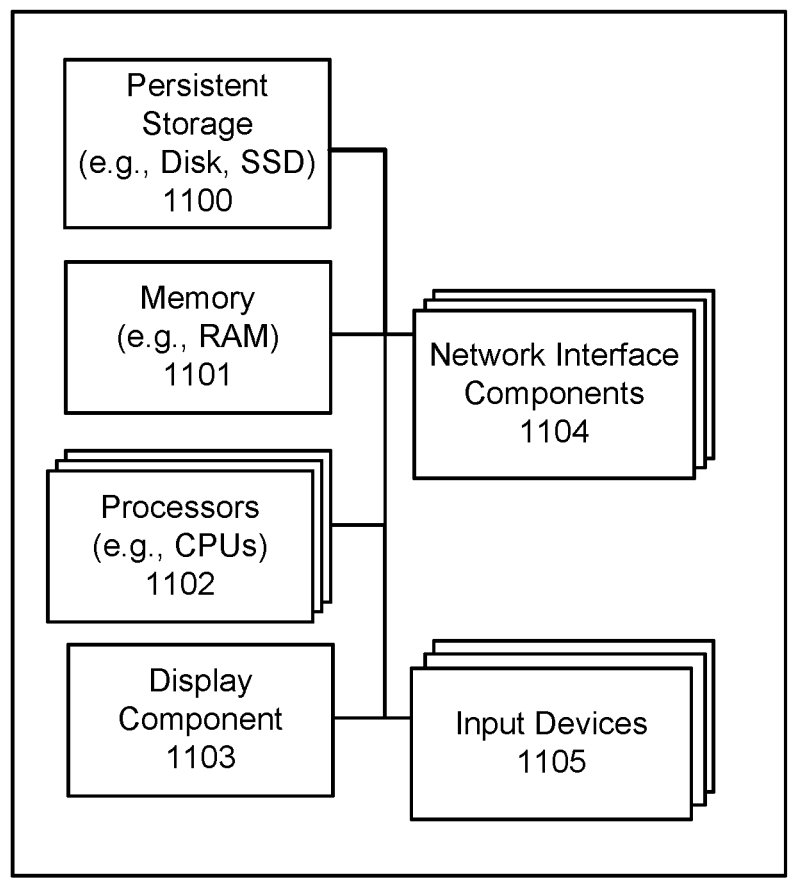
FIG. 11 illustrates an example of some general components of a computing device that can be utilized in conjunction with various embodiments described in the present specification.

FIG. 11 illustrates an example of some general components of a computing device that can be utilized in conjunction with various embodiments described in the present specification. In this particular example, the computing device includes one or more processors (e.g., central processing units (CPUs) 1102 for executing instructions that can be stored in a storage medium. The storage medium may take the form of memory 1101 (e.g., RAM), persistent storage 1100 (e.g., disk, flash, SSD, etc.) or any combination thereof. As used herein, the terms "storage medium", "computer readable storage medium", and "non-transitory storage medium" are all used interchangeably and can include many different types of volatile memory or persistent storage, such as random access memory (RAM) storing program instructions for execution by the processor 1102, a separate form of storage for images or data, a removable memory for sharing information with other devices and the like.

The computing device typically further comprises a display component 1103, such as a computer monitor, a touch screen, liquid crystal display (LCD), light-emitting diode (LED) display, or the like. The display component 1103 is conventionally used to display images or information to the user so that the user may interact with the computing device. In various embodiments, the computing device will also include a set of input devices 1105 capable of receiving input from a user. This input can include, for example, a conventional keyboard, a mouse, a button, a touch pad, a touch screen, or any other such component whereby a user can input a command to the device, provide information to the device or otherwise interact with the device. In some embodiments, the computing device can include one or more network interface components (NICs) 1104 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for conveying a video stream to a client device from a server, comprising:
    receiving the video stream containing encoded child frames at the client device from the server, each child frame containing screen data corresponding to one of two or more child buffers, wherein a framebuffer of the client device is divided into the two or more child buffers, and wherein the server is configured to:
        receive a frame in a framebuffer on the server, the framebuffer on the server being divided into two or more child buffers corresponding to the two or more child buffers of the framebuffer of the client;
        determine that a child buffer of the framebuffer on the server contains changed screen data from a preceding frame received in the framebuffer of the server;
        in response to determining that the child buffer of the framebuffer on the server contains changed screen data, encode the determined changed child buffer to produce an encoded child frame and convey the encoded child frame to the client device in the video stream;
    decoding, by a decoder on the client device, the received child frame in the video stream;
    updating a corresponding child buffer of the framebuffer of the client device with the received child frame; and
    displaying contents of the updated framebuffer of the client device on a display of the client device.

2. The method of claim 1, further comprising determining to which child buffer the received child frame corresponds based on an identifier associated with the received child frame in the video stream that indicates to which child buffer of the two or more child buffers the received child frame corresponds.

3. The method of claim 2, wherein the identifier comprises a row of blocks added to the received child frame that uniquely identifies the child buffer corresponding to the received child frame with color values of pixels in the added blocks.

4. The method of claim 1, further comprising removing padding pixels from the received child frame, wherein the padding pixels are added to the received child frame to make the size of the received child frame suitable for the decoder.

5. The method of claim 1, wherein the video stream transmits a graphical user interface of a virtual desktop from a host server to the client device in a virtual desktop infrastructure.

6. The method of claim 1, wherein the framebuffer is divided into the two or more child buffers such that the resulting size of each child buffer is sufficiently small to be processed by the decoder.

7. The method of claim 6, wherein the decoder is a hardware decoder.

8. A computing device for conveying a video stream to a client device from a server, comprising:
    at least one processor; and
    memory including instructions that, when executed by the at least one processor, cause the computing device to perform the steps of:
        receiving the video stream containing encoded child frames at the client device from the server, each child frame containing screen data corresponding to one of two or more child buffers, wherein a framebuffer of the client device is divided into the two or more child buffers, and wherein the server is configured to:
receive a frame in a framebuffer on the server, the framebuffer on the server being divided into two or more child buffers corresponding to the two or more child buffers of the framebuffer of the client;
determine that a child buffer of the framebuffer on the server contains changed screen data from a preceding frame received in the framebuffer of the server;
in response to determining that the child buffer of the framebuffer on the server contains changed screen data, encode the determined changed child buffer to produce an encoded child frame and convey the encoded child frame to the client device in the video stream;
decoding, by a decoder on the client device, the received child frame in the video stream;
updating a corresponding child buffer of the framebuffer of the client device with the received child frame; and
displaying contents of the updated framebuffer of the client device on a display of the client device.

9. The computing device of claim 8, wherein the memory further includes instructions that when executed by the at least one processor, cause the computing device to perform the steps of determining to which child buffer the received child frame corresponds based on an identifier associated with the received child frame in the video stream that indicates to which child buffer of the two or more child buffers the received child frame corresponds.

10. The computing device of claim 9, wherein the identifier comprises a row of blocks added to the received child frame that uniquely identifies the child buffer corresponding to the received child frame with color values of pixels in the added blocks.

11. The computing device of claim 8, wherein the memory further includes instructions that when executed by the at least one processor, cause the computing device to perform the steps of removing padding pixels from the received child frame, wherein the padding pixels are added to the received child frame to make the size of the received child frame suitable for the decoder.

12. The computing device of claim 8, wherein the video stream transmits a graphical user interface of a virtual desktop from a host server to the client device in a virtual desktop infrastructure.

13. The computing device of claim 8, wherein the framebuffer is divided into the two or more child buffers such that the resulting size of each child buffer is sufficiently small to be processed by the decoder.

14. The computing device of claim 13, wherein the decoder is a hardware decoder.

15. A non-transitory computer readable storage medium for conveying a video stream to a client device from a server comprising one or more sequences of instructions, the instructions when executed by one or more processors causing the one or more processors to execute the operations of:
receiving the video stream containing encoded child frames at the client device from the server, each child frame containing screen data corresponding to one of two or more child buffers, wherein a framebuffer of the client device is divided into the two or more child buffers, and wherein the server is configured to:
receive a frame in a framebuffer on the server, the framebuffer on the server being divided into two or more child buffers corresponding to the two or more child buffers of the framebuffer of the client;
determine that a child buffer of the framebuffer on the server contains changed screen data from a preceding frame received in the framebuffer of the server;
in response to determining that the child buffer of the framebuffer on the server contains changed screen data, encode the determined changed child buffer to produce an encoded child frame and convey the encoded child frame to the client device in the video stream;
decoding, by a decoder on the client device, the received child frame in the video stream;
updating a corresponding child buffer of the framebuffer of the client device with the received child frame; and
displaying contents of the updated framebuffer of the client device on a display of the client device.

16. The non-transitory computer readable storage medium of claim 15, further comprising instructions that when executed by the one or more processors cause the one or more processors to execute the operations of determining to which child buffer the received child frame corresponds based on an identifier associated with the received child frame in the video stream that indicates to which child buffer of the two or more child buffers the received child frame corresponds.

17. The non-transitory computer readable storage medium of claim 16, wherein the identifier comprises a row of blocks added to the received child frame that uniquely identifies the child buffer corresponding to the received child frame with color values of pixels in the added blocks.

18. The non-transitory computer readable storage medium of claim 15, further comprising instructions that when executed by the one or more processors cause the one or more processors to execute the operations of removing padding pixels from the received child frame, wherein the padding pixels are added to the received child frame to make the size of the received child frame suitable for the decoder.

19. The non-transitory computer readable storage medium of claim 15, wherein the video stream transmits a graphical user interface of a virtual desktop from a host server to the client device in a virtual desktop infrastructure.

20. The non-transitory computer readable storage medium of claim 15, wherein the framebuffer is divided into the two or more child buffers such that the resulting size of each child buffer is sufficiently small to be processed by the decoder.

* * * * *